(12) United States Patent
Hoffman et al.

(10) Patent No.: US 11,420,137 B2
(45) Date of Patent: Aug. 23, 2022

(54) EFFLUENT PROCESSING APPARATUS FOR A VEHICLE AIR BRAKE CHARGING SYSTEM

(71) Applicant: Bendix Commercial Vehicles Systems LLC, Elyria, OH (US)

(72) Inventors: Fred W. Hoffman, Wakeman, OH (US); Stephen Howe, Cuyahoga Falls, OH (US); David W. Perry, North Ridgeville, OH (US); Gregory R. Ashley, Amherst, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 17/160,913

(22) Filed: Jan. 28, 2021

(65) Prior Publication Data

US 2021/0146279 A1 May 20, 2021

Related U.S. Application Data

(63) Continuation of application No. 15/966,544, filed on Apr. 30, 2018, now Pat. No. 10,933,351.

(51) Int. Cl.
| | |
|---|---|
| *B01D 47/00* | (2006.01) |
| *B01D 17/04* | (2006.01) |
| *B01D 45/08* | (2006.01) |
| *B60T 17/00* | (2006.01) |
| *B01D 45/12* | (2006.01) |

(Continued)

(52) U.S. Cl.
CPC ........... *B01D 17/045* (2013.01); *B01D 45/08* (2013.01); *B01D 45/12* (2013.01); *B60T 17/004* (2013.01); *B01D 53/0407* (2013.01); *B01D 53/261* (2013.01); *B01D 2257/80* (2013.01); *B01D 2259/40086* (2013.01); *B01D 2259/4566* (2013.01)

(58) Field of Classification Search
CPC .. B01D 17/045; B01D 45/08; B01D 53/0407; B01D 53/261; B01D 2259/40086; B01D 2259/4566; B60T 17/004
See application file for complete search history.

(56) References Cited

U.S. PATENT DOCUMENTS

| | | | | |
|---|---|---|---|---|
| 2,464,648 A | * | 3/1949 | Niederkorn | F24F 3/16 55/297 |
| 2,942,691 A | * | 6/1960 | Dillon | F04B 39/16 55/426 |

(Continued)

*Primary Examiner* — Dung H Bui
(74) *Attorney, Agent, or Firm* — Cheryl Greenly; Brian Kondas; Eugene Clair (57) ABSTRACT

An effluent processing device includes an input port to receive an effluent mixture containing air, oil, and water. One or more baffles are positioned between the input port and at least one air outlet to deflect the effluent mixture to assist in separating the oil and the water from the air. A member positioned below the one or more baffles selectively allows only oil of the separated oil and water to pass from a first side of the member through openings in the member to a second side of the member. A sump is arranged to receive and retain the oil on the second side of the member as the oil passes from the first side to the second side. The effluent processing devices includes at least one air outlet through which air is exhausted to atmosphere.

12 Claims, 7 Drawing Sheets

(51) Int. Cl.
*B01D 53/04* (2006.01)
*B01D 53/26* (2006.01)

(56) References Cited

U.S. PATENT DOCUMENTS

| | | | | |
|---|---|---|---|---|
| 3,216,182 | A * | 11/1965 | Cochran | B01D 45/08 55/336 |
| 3,339,533 | A * | 9/1967 | Ingemar | F02M 35/02 123/572 |
| 4,048,911 | A * | 9/1977 | Petersen | B60H 3/0616 454/136 |
| 4,151,087 | A * | 4/1979 | Sakaguchi | B01D 17/045 210/109 |
| 4,162,905 | A * | 7/1979 | Schuler | B01D 45/16 55/337 |
| 4,298,465 | A * | 11/1981 | Druffel | B01D 17/0211 210/304 |
| 4,333,835 | A * | 6/1982 | Lynch | B01D 17/00 210/305 |
| 4,416,782 | A * | 11/1983 | Kerres | B01D 17/045 210/483 |
| 5,320,653 | A * | 6/1994 | Morgan | B01D 46/2411 55/337 |
| 9,670,808 | B2 * | 6/2017 | Gorbach | B04B 7/12 |
| 10,786,775 | B2 * | 9/2020 | Oberli | B01D 45/16 |
| 2007/0044437 | A1 * | 3/2007 | Larnholm | B01D 45/16 55/319 |
| 2009/0196806 | A1 * | 8/2009 | Larnholm | B04C 5/103 422/269 |
| 2010/0000409 | A1 * | 1/2010 | Alper | C02F 1/004 95/143 |
| 2014/0275692 | A1 * | 9/2014 | Patel | B01D 39/1623 585/818 |
| 2014/0284264 | A1 * | 9/2014 | Klein | F02M 37/28 210/437 |
| 2015/0075377 | A1 * | 3/2015 | Gorbach | B04B 5/12 95/270 |
| 2016/0089680 | A1 * | 3/2016 | Buck | B01D 45/14 494/74 |
| 2016/0090547 | A1 * | 3/2016 | Forest | C11B 3/00 554/122 |
| 2016/0206985 | A1 * | 7/2016 | Garrett | B01D 45/14 |
| 2016/0236211 | A1 * | 8/2016 | Kvamsdal | B01D 46/521 |
| 2017/0189832 | A1 * | 7/2017 | Fleischhaker | C09D 4/06 |
| 2017/0218895 | A1 * | 8/2017 | Girondi | F02M 37/24 |
| 2018/0002212 | A1 * | 1/2018 | Englram | B01D 61/025 |
| 2018/0036746 | A1 * | 2/2018 | Antomon | B01D 46/00 |
| 2018/0169553 | A1 * | 6/2018 | Billiet | B01D 45/16 |
| 2018/0280833 | A1 * | 10/2018 | Kruyer | B01D 17/045 |
| 2018/0304878 | A1 * | 10/2018 | Otsuka | B01D 39/1623 |
| 2019/0111375 | A1 * | 4/2019 | Chen | B01D 46/10 |
| 2019/0184333 | A1 * | 6/2019 | Howe | B60T 17/004 |
| 2020/0094166 | A1 * | 3/2020 | Mundheim | B01D 17/08 |

* cited by examiner

EFFLUENT PROCESSING APPARATUS FOR A VEHICLE AIR BRAKE CHARGING SYSTEM

CROSS REFERENCE TO RELATED APPLICATIONS

This application is a continuation of the pending U.S. patent application Ser. No. 15/966,544 entitled "Effluent Processing Apparatus for a Vehicle Air Brake Charging System" filed Apr. 30, 2018, the entire disclosure of which is incorporated fully herein by reference.

BACKGROUND

The present application relates to vehicle air brake charging systems, and is particularly directed to an effluent processing apparatus for a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge mode. As the supply reservoir air pressure drops to a preset "cut-in" setting of the governor, the governor returns the compressor back to building air and the air dryer to air drying mode.

The air dryer is an in-line filtration system that removes both water vapor and oil droplets from the compressor discharge air after it leaves the compressor. This results in cleaner, drier air being supplied to the air braking system, and aids in the prevention of air line and component freeze ups in winter weather. The air dryer typically uses a replaceable cartridge containing a desiccant material and an oil separator. Most of the oil droplets are removed by the oil separator as the air passes into the air dryer. The air then moves through the desiccant material which removes most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the process. A small amount of dry air passes back through the desiccant material and the water that has been collected, as well as any oil droplets collected by the oil separator, are purged out through a purge valve to atmosphere. Since the purged air from the purge valve contains oil droplets, this results in depositing of oil onto roadways by the truck. Accordingly, those skilled in the art continue with research and development efforts in cleaning the purged air from purge valves.

SUMMARY

In accordance with one embodiment, an effluent processing apparatus comprises a separator device arranged to receive an effluent mixture containing air, oil, and water to separate oil and water from the effluent mixture and thereby to provide clean air. The effluent processing apparatus also comprises a member for selectively allowing either only oil or only water of the separated oil and water from the separator device to pass from a first side of the member through openings in the member to a second side of the member. The effluent processing apparatus further comprises a sump arranged to (i) receive and retain the oil on the first side of the member if only water passes from the first side to the second side, and (ii) receive and retain the oil on the second side of the member if only oil passes from the first side to the second side, an air outlet through which clean air from the separator device is exhausted to atmosphere, and a water outlet through which water is drained to atmosphere.

In accordance with another embodiment, an effluent processing apparatus comprises a separator device arranged to receive an effluent mixture containing air, oil, and water from a purge valve of an air dryer to separate oil and water from the effluent mixture and thereby to provide clean air. The effluent processing apparatus also comprises a mesh screen arranged to receive the separated oil and water from the separator device to allow the oil to flow through mesh openings in the mesh screen and to prevent the water from flowing through mesh openings in the mesh screen. The effluent processing apparatus further comprises a sump arranged to receive and retain oil that has flowed through the mesh openings in the mesh screen, an air outlet through which clean air from the separator device is exhausted to atmosphere. And a water outlet through which water that has been prevented from flowing through mesh openings in the mesh screen is drained to atmosphere.

In accordance with yet another embodiment, an effluent processing apparatus comprises a separator device arranged to receive an effluent mixture containing air, oil, and water from a purge valve of an air dryer to separate oil and water from the effluent mixture and thereby to provide clean air. The effluent processing apparatus also comprises a mesh screen arranged to receive the separated oil and water from the separator device to prevent the oil from flowing through mesh openings in the mesh screen and the water to flow through mesh openings in the mesh screen. The effluent processing apparatus further comprises a sump arranged to receive and retain oil that is prevented from flowing through mesh openings in the mesh screen, an air outlet through which clean air from the separator device is exhausted to atmosphere, and a water outlet through which water that has flowed through mesh openings in the mesh screen is drained to atmosphere.

DETAILED DESCRIPTION

Figure 1:
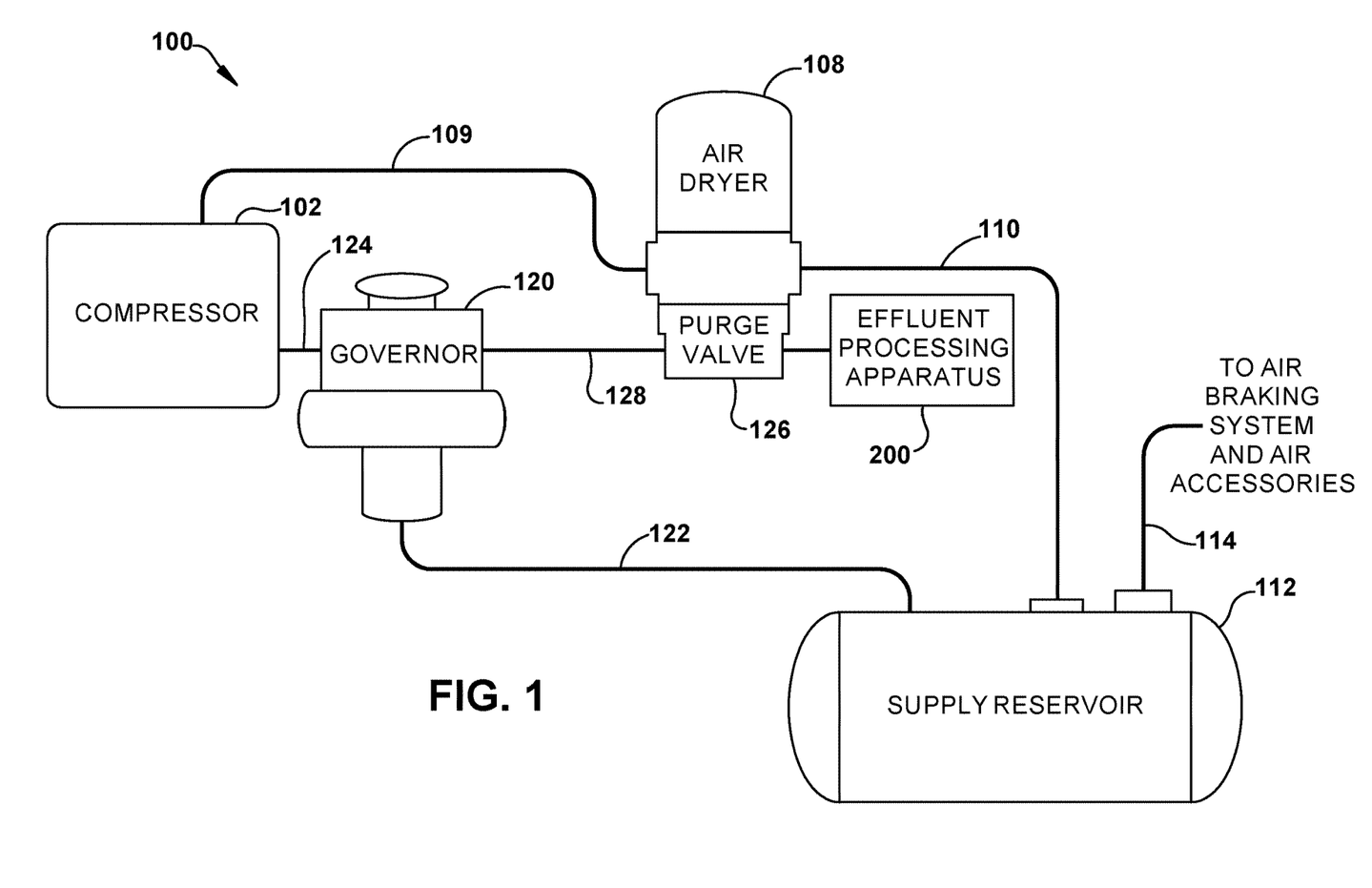
FIG. 1 is a schematic diagram of a vehicle air brake charging system including an example effluent processing apparatus constructed in accordance with an embodiment.

Referring to FIG. 1, a schematic diagram of a vehicle air brake charging system 100 including an example effluent processing apparatus 200 constructed in accordance with an embodiment is illustrated. Vehicle air brake charging system 100 includes an air compressor 102 that generates compressed air in conventional manner. Structure and operation of air compressors are known and, therefore, will not be described.

A first discharge line 109 is pneumatically connected between the compressor 102 and an air dryer 108. A second discharge line 110 is pneumatically connected between the air dryer 108 and a supply reservoir 112. Air supply line 114 is pneumatically connected between the supply reservoir 112 and air braking system and air accessories (not shown) of the vehicle.

A governor 120 controls system air pressure between a preset maximum and minimum pressure level by monitoring the air pressure in pneumatic control line 122 from the supply reservoir 112. When air pressure in the supply reservoir 112 becomes greater than that of a preset "cut-out" setting of the governor 120, the governor controls the compressor 102 on pneumatic control line 124 to stop the compressor from building air. The governor 120 also controls a purge valve 126 on pneumatic control line 128 to purge air from the air dryer 108 in a purge mode. When air pressure in the supply reservoir 112 drops to a preset "cut-in" setting of the governor 120, the governor returns the compressor 102 back to building air and the air dryer 108 to an air drying mode.

Figure 2:
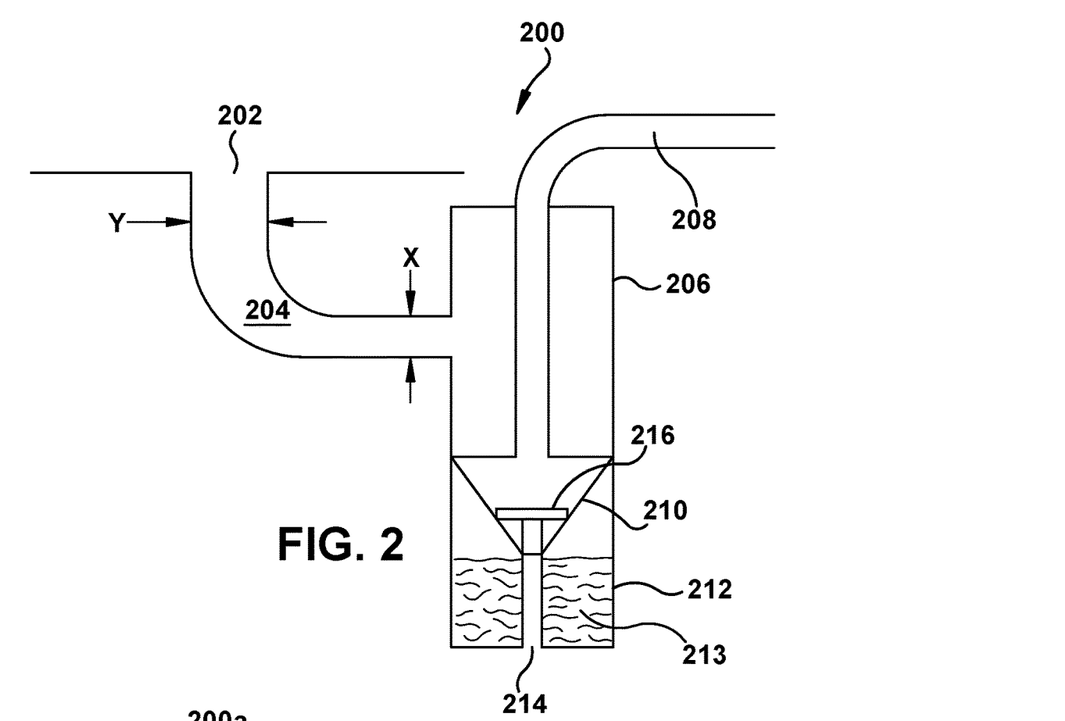
FIG. 2 is a schematic diagram showing the effluent processing apparatus of FIG. 1 constructed in accordance with a first embodiment.

Referring to FIG. 2, a schematic diagram shows the effluent processing apparatus 200 of FIG. 1 constructed in accordance with a first embodiment. The effluent processing apparatus 200 includes an inlet port 202 through which effluent containing a mixture of air, oil, and water from the purge valve 126 (FIG. 1) of the air dryer 108 can be received. Alternatively, the effluent may be received from any device that collects air, water, and contaminants. An effluent channel 204 interconnects the inlet port 202 and a separator device 206. The cross-section "X" of the effluent channel 204 at the separator device 206 is smaller as compared to the cross-section "Y" at the inlet port 202 to increase the velocity of the effluent as the effluent flows from the inlet port 202 to the separator device 206. The effluent enters inlet port 202 so as to enter the effluent channel 204 tangentially.

The separator device 206 is arranged to separate oil and water from the effluent mixture and thereby to provide clean air. The separator device 206 may have any configuration that can separate oil and water from the effluent mixture to provide clean air. As an example, the separator device 206 may have a configuration of a cyclone through which the effluent mixture flows to separate oil and water from the effluent mixture. As another example, the separator device 206 may have a configuration of a spiral-channel through which the effluent mixture flows to separate oil and water from the effluent mixture. Other configurations of the separator device 206 are possible. Oil-free air (i.e., clean air) from the separator device 206 is exhausted upwards through an air outlet 208 to atmosphere.

The effluent processing apparatus 200 also includes a member 210 in the form of a mesh screen that is disposed below the air outlet 208. The mesh screen 210 comprises oleophilic material that selectively allows only oil in the separated oil and water from the separator device 206 to flow through mesh openings in the mesh screen 210. The mesh screen 210 is arranged to receive the separated oil and water from the separator device 206 to allow the oil to flow through mesh openings in the mesh screen 210 and to prevent the water from flowing through mesh openings in the mesh screen 210.

The effluent processing apparatus 200 further includes a sump 212 that is disposed below the mesh screen 210. The sump 212 is arranged to receive and retain oil that has flowed through mesh openings in the mesh screen 210. Optionally, the sump 212 contains collection media 213 that may include a sponge material, for example. Other collection media can be used. Alternatively, no collection media may be used, and the space is designed to collect and keep oil from exiting the sump 212. If used, the collection media holds the oil until the collection media or the sump 212 or both, are replaced. Water that has been prevented from flowing through mesh openings in the mesh screen 210 is drained through a water outlet 214 to atmosphere.

More specifically, in the first embodiment of the effluent processing apparatus 200 shown in FIG. 2, the mesh screen 210 is disposed above the sump 212 and has a cone shape. The apex of the cone-shaped mesh screen 210 points down such that water that has been prevented from flowing through mesh openings in the mesh screen 210 flows downward towards the apex. The water outlet 214 disposed near the apex of the cone-shaped mesh screen 210 then directs the water downwards to drain to atmosphere.

Optionally, a normally-open drain valve 216 is disposed in the vicinity of the apex of the cone-shaped mesh screen 210 and above the water outlet 214. The drain valve 216 is open when no pressure exists in the vicinity of the apex of the cone-shaped mesh screen 210 to allow the collected water to drain through the water outlet 214 to atmosphere.

Figure 3:
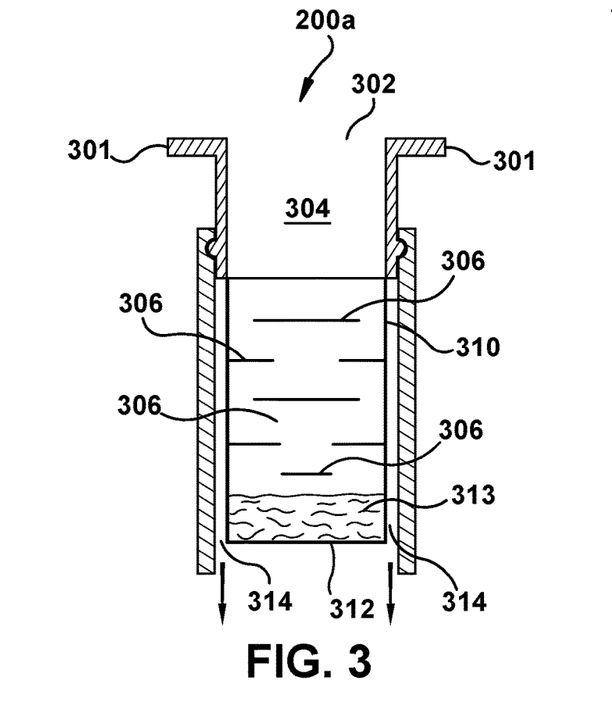
FIG. 3 is a schematic diagram showing the effluent processing apparatus of FIG. 1 constructed in accordance with a second embodiment.

Referring to FIG. 3, a schematic diagram shows an effluent processing apparatus 200a constructed in accordance with a second embodiment. Flanges 301 are provided to assist personnel in installing the effluent processing apparatus 200a. The effluent processing apparatus 200a includes an inlet port 302 through which effluent containing a mixture of air, oil, and water from the purge valve 126 (FIG. 1) of the air dryer 108 can be received. Alternatively, the effluent may be received from any device that collects air, water, and contaminants. An effluent channel 304 interconnects the inlet port 302 and a separator device in the form of an arrangement of one or more baffles 306 (e.g., seven baffles shown in FIG. 3). The baffles 306 may include staggered co-axial baffles. The baffles 306 are arranged in a configuration that improves inertial impaction and disrupts flow to separate oil and water from the effluent mixture. Oil-free air (i.e., clean air) passes through a member 310 in the form of a mesh screen and is exhausted to atmosphere through a combined air and water outlet 314.

The mesh screen 310 comprises hydrophilic material that selectively allows only water in the separated oil and water from the baffles 306 to flow through mesh openings in the mesh screen 310. The mesh screen 310 is arranged to receive the separated oil and water deflected off of the baffles 306 to allow the water to flow through mesh openings in the mesh screen 310 and to prevent the oil from flowing through mesh openings in the mesh screen 310.

The effluent processing apparatus 200a further includes a sump 312 that is disposed within the mesh screen 310. The sump 312 is arranged to receive and retain oil that has flowed downwards from the baffles 306. Optionally, the sump 312 contains collection media 313 that may include a sponge material, for example. Other collection media can be used. Alternatively, no collection media may be used, and the space is designed to collect and keep oil from exiting the sump 312. If used, the collection media 313 holds the oil until the collection media 313 or the sump 312 or both, are replaced. Air and water that has flowed through mesh openings in the mesh screen 310 are directed downwards through the outlet 314 to atmosphere.

More specifically, in the second embodiment of FIG. 3, the mesh screen 310 has a substantially cylinder shape, and the sump 312 is disposed at a bottom end of the cylinder-shaped mesh screen 310. The outlet 314 is disposed on an outer circumferential side of the mesh screen 310. Oil that has been prevented from flowing through mesh openings in the mesh screen 310 collects at the bottom end of the cylinder-shaped mesh screen 310. The baffles 306 are disposed on an inner circumferential side of the mesh screen 310 to deflect the effluent mixture to create impact force to assist in separating oil, water, and air.

Figure 4:
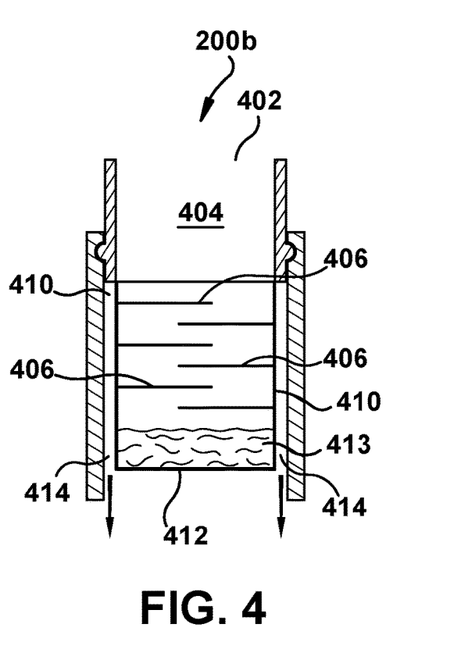
FIG. 4 is a schematic diagram showing the effluent processing apparatus of FIG. 1 constructed in accordance with a third embodiment.

Referring to FIG. 4, a schematic diagram shows an effluent processing apparatus 200b constructed in accordance with a third embodiment. The effluent processing apparatus 200b includes an inlet port 402 through which effluent containing a mixture of air, oil, and water from the purge valve 126 (FIG. 1) of the air dryer 108 can be received. Alternatively, the effluent may be received from any device that collects air, water, and contaminants. An effluent channel 404 interconnects the inlet port 402 and a separator device in the form of an arrangement of one or more baffles 406 (e.g., six baffles shown in FIG. 4). The baffles 406 may include staggered baffles and are arranged in a configuration that improves inertial impaction and disrupts flow to separate oil and water from the effluent mixture. Oil-free air (i.e., clean air) passes through a member 410 in the form of a mesh screen and is exhausted to atmosphere through a combined air and water outlet 414.

The mesh screen 410 is arranged to receive the separated oil and water deflected off of the baffles 406 to selectively allow the water to flow through mesh openings in the mesh screen 410 and to prevent the oil from flowing through mesh openings in the mesh screen 410.

The effluent processing apparatus 200b further includes a sump 412 that is arranged to receive and retain oil that has flowed downwards from the baffles 406. The sump 412 is disposed within the mesh screen 410. Optionally, the sump 412 contains collection media 413 that may include a sponge material, for example. Other collection media can be used. Alternatively, no collection media may be used, and the space is designed to collect and keep oil from exiting the sump 412. If used, the collection media 413 holds the oil until the collection media 413 or the sump 412 or both, are replaced. Air and water that has flowed through mesh openings in the mesh screen 410 are directed downwards through the outlet 414 to atmosphere.

More specifically, in the third embodiment of FIG. 4, the mesh screen 410 has a substantially cylinder shape, and the sump 412 is disposed at a bottom end of the cylinder-shaped mesh screen 410. The outlet 414 is disposed on an outer circumferential side of the mesh screen 410. Oil that has been prevented from flowing through mesh openings in the mesh screen 410 collects at the bottom end of the cylinder-shaped mesh screen 410. The baffles 406 are disposed on an inner circumferential side of the mesh screen 410 to deflect the effluent mixture to create impact force to assist in separating oil, water, and air.

Figure 5:
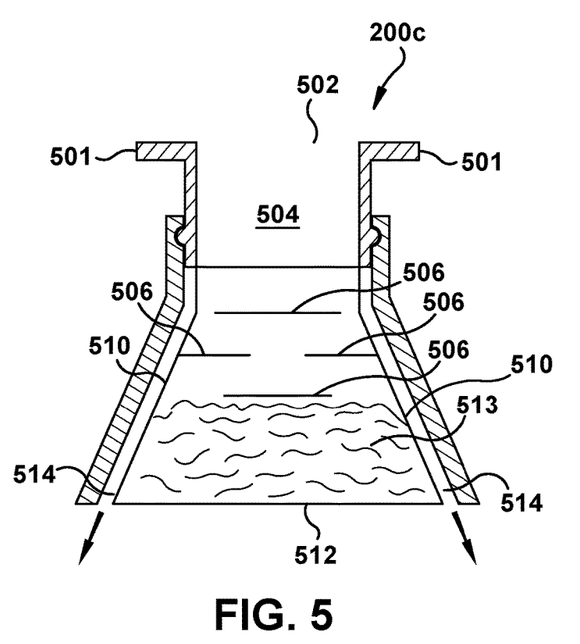
FIG. 5 is a schematic diagram showing the effluent processing apparatus of FIG. 1 constructed in accordance with a fourth embodiment.

Referring to FIG. 5, a schematic diagram shows an effluent processing apparatus 200c constructed in accordance with a fourth embodiment. Flanges 501 are provided to allow the effluent processing apparatus 200c to be attached to the air dryer 108 at the purge valve 126 (FIG. 1). The effluent processing apparatus 200c includes an inlet port 502 through which effluent containing a mixture of air, oil, and water from the purge valve 126 of the air dryer 108 can be received. Alternatively, the effluent may be received from any device that collects air, water, and contaminants. An effluent channel 504 interconnects the inlet port 502 and a separator device in the form of an arrangement of one or more baffles 506 (e.g., four baffles shown in FIG. 5). The baffles 506 may include staggered co-axial baffles and are arranged in a configuration that improves inertial impaction and disrupts flow to separate oil and water from the effluent mixture. Oil-free air (i.e., clean air) passes through a member 510 in the form of a mesh screen and is exhausted to atmosphere through a combined air and water outlet 514.

The mesh screen 510 is arranged to receive the separated oil and water deflected off of the baffles 506 to selectively allow the water to flow through mesh openings in the mesh screen 510 and to prevent the oil from flowing through mesh openings in the mesh screen 510.

The effluent processing apparatus 200c further includes a sump 512 that is arranged to receive and retain oil that has flowed downwards from the baffles 506. The sump 512 is disposed within the mesh screen 510. Optionally, the sump 512 contains collection media 513 that may include a sponge material, for example. Other collection media can be used. Alternatively, no collection media may be used, and the space is designed to collect and keep oil from exiting the sump 512. If used, the collection media 513 holds the oil until the collection media 513 or the sump 512 or both, are replaced. Air and water that has flowed through mesh openings in the mesh screen 510 are directed downwards through the outlet 514 to atmosphere.

More specifically, in the fourth embodiment of the effluent processing apparatus 200c shown in FIG. 5, the mesh screen 510 is disposed above the sump 512 and has a cone shape in which apex of the cone-shaped mesh screen 510 points up such that oil that has been prevented from flowing through mesh openings in the cone-shaped mesh screen 510 flows downward towards base of the cone-shaped mesh screen 510. The oil that has been prevented from flowing through mesh openings in the cone-shaped mesh screen 510 collects at the bottom end of the cone-shaped mesh screen 510. The baffles 506 are disposed on an inner circumferential side of the cone-shaped mesh screen to deflect the effluent mixture to create impact force to assist in separating oil, water, and air. The outlet 514 is disposed on an outer circumferential side of the cone-shaped mesh screen 510.

Figure 6:
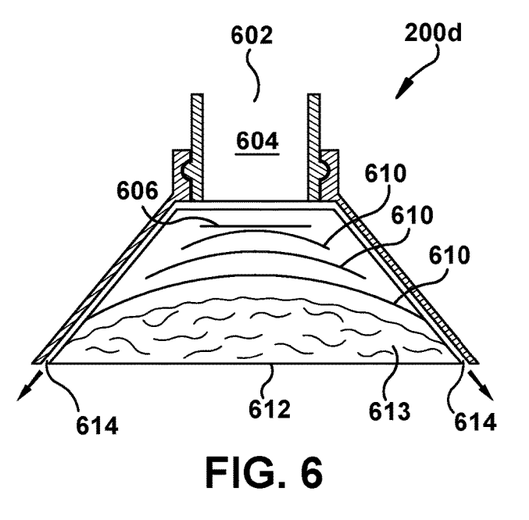
FIG. 6 is a schematic diagram showing the effluent processing apparatus of FIG. 1 constructed in accordance with a fifth embodiment.

Referring to FIG. 6, a schematic diagram shows an effluent processing apparatus 200*d* constructed in accordance with a fifth embodiment. The effluent processing apparatus 200*d* includes an inlet port 602 through which effluent containing a mixture of air, oil, and water from the purge valve 126 (FIG. 1) of the air dryer 108 can be received. Alternatively, the effluent may be received from any device that collects air, water, and contaminants. An effluent channel 604 interconnects the inlet port 602 and a separator device in the form of an arrangement of one or more baffles 606 (e.g., one baffle shown in FIG. 6). The baffle 606 is arranged in a configuration that improves inertial impaction and disrupts flow to separate oil and water from the effluent mixture. Oil-free air (i.e., clean air) is exhausted through a combined air and water outlet 614 to atmosphere.

The effluent processing apparatus 200*d* also includes multiple members 610 in the form of multiple mesh screens (e.g., three mesh screens shown in FIG. 6). The mesh screens 610 are flexible and arranged to receive the separated oil and water deflected off of the baffle 606 to selectively allow the oil to flow through mesh openings in the mesh screens 610 and to prevent the water from flowing through mesh openings in the mesh screens 610. The mesh screens 610 comprise oleophilic material that allows only oil in the separated oil and water from the baffle 606 to flow through mesh openings in the mesh screens 610.

The effluent processing apparatus 200*d* further includes a sump 612 that is disposed below the mesh screens 610. The sump 612 is arranged to receive and retain oil that has flowed downwards from the baffle 606 and the mesh screens 610. Optionally, the sump 612 contains collection media 613 that may include a sponge material, for example. Other collection media can be used. Alternatively, no collection media may be used, and the space is designed to collect and keep oil from exiting the sump 612. If used, the collection media 613 holds the oil until the collection media 613 or the sump 612 or both, are replaced. Air and water that has been prevented from flowing through mesh openings in the mesh screens 610 are directed through the outlet 614 to atmosphere.

More specifically, in the fifth embodiment of the effluent processing apparatus 200*d* shown in FIG. 6, each of the mesh screens 610 is disposed above the sump 612 and has an arcuate shape such that oil flowing through mesh openings in the arcuate-shaped mesh screens 610 flows downward towards base of the arcuate-shaped mesh screens 610. The oil collects at the base of the arcuate-shaped mesh screens 610. The baffle 606 is disposed above the arcuate-shaped mesh screens 610 to deflect the effluent mixture to create impact force to assist in separating oil, water, and air.

Figure 7:
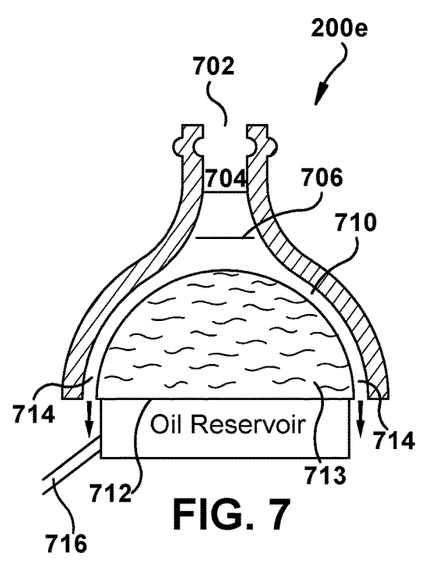
FIG. 7 is a schematic diagram showing the effluent processing apparatus of FIG. 1 constructed in accordance with a sixth embodiment.

Referring to FIG. 7, a schematic diagram shows an effluent processing apparatus 200*e* constructed in accordance with a sixth embodiment. The effluent processing apparatus 200*e* includes an inlet port 702 through which effluent containing a mixture of air, oil, and water from the purge valve 126 (FIG. 1) of the air dryer 108 can be received. Alternatively, the effluent may be received from any device that collects air, water, and contaminants. An effluent channel 704 interconnects the inlet port 702 and a separator device in the form of an arrangement of one or more baffles 706 (e.g., one baffle shown in FIG. 7). The baffle 706 is arranged in a configuration that improves inertial impaction and disrupts flow to separate oil and water. Oil-free air (i.e., clean air) is exhausted through a combined air and water outlet 714 to atmosphere.

The effluent processing apparatus 200*e* also includes one or more members 710 in the form of one or more mesh screens (e.g., one mesh screen shown in FIG. 7) in a hemispherical shape. The mesh screen 710 is arranged to receive the separated oil and water deflected off of the baffle 706 to selectively allow the oil to flow through mesh openings in the mesh screen 710 and to prevent the water from flowing through mesh openings in the mesh screen 710. The mesh screen 710 comprises oleophilic material that allows only oil in the separated oil and water from the baffle 706 to flow through mesh openings in the mesh screen 710.

The effluent processing apparatus 200*e* further includes a sump 712 that is arranged to receive and retain oil that has flowed downwards from the baffle 706 and the mesh screen 710. The sump 712 is disposed below the mesh screen 710. Optionally, the sump 712 contains collection media 713 that may include a sponge material, for example. Other collection media can be used. Alternatively, no collection media may be used, and the space is designed to collect and keep oil from exiting the sump 712. If used, the collection media 713 holds the oil until the collection media 713 or the sump 712 or both, are replaced. Air and water that has been prevented from flowing through mesh openings in the mesh screen 710 are directed through the outlet 714 to atmosphere.

More specifically, in the sixth embodiment of the effluent processing apparatus 200*e* shown in FIG. 7, the mesh screen 710 is disposed above the sump 712 and has a semi-circle shape such that oil flowing through mesh openings in the semi-circle-shaped mesh screen 710 flows downward towards base of the semi-circle-shaped mesh screen 710. The oil collects at bottom of the semi-circle-shaped mesh screen 710. The baffle 706 is disposed at top of the semi-circle-shaped mesh screen 710 to deflect the effluent mixture to create impact force to assist in separating oil, water, and air. The outlet 714 is disposed on an outer circumferential side of the semi-circle-shaped mesh screen 710. Oil outlet 716 allows oil that has been retained in the sump 712 to be drained out.

Figure 8A:
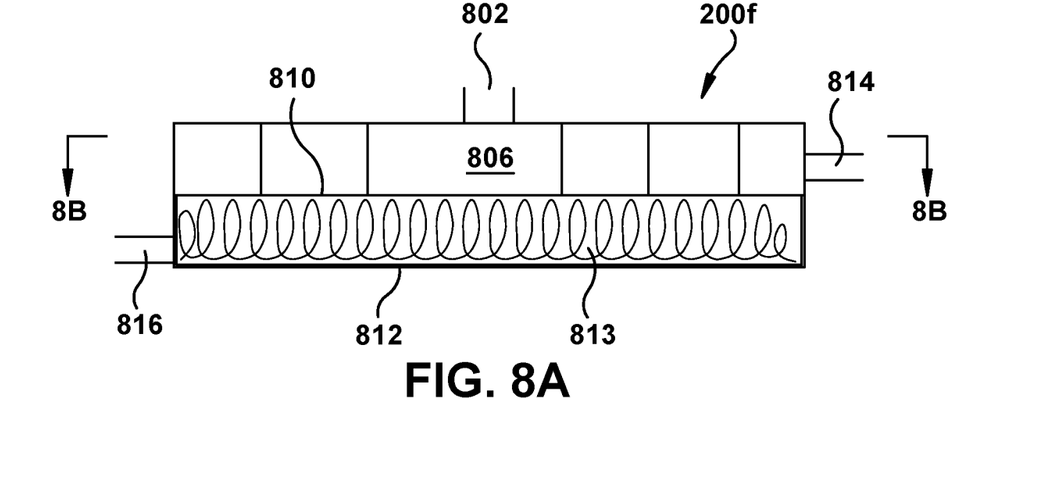
FIG. 8A is a schematic diagram showing the effluent processing apparatus of FIG. 1 constructed in accordance with a seventh embodiment.
Figure 8B:
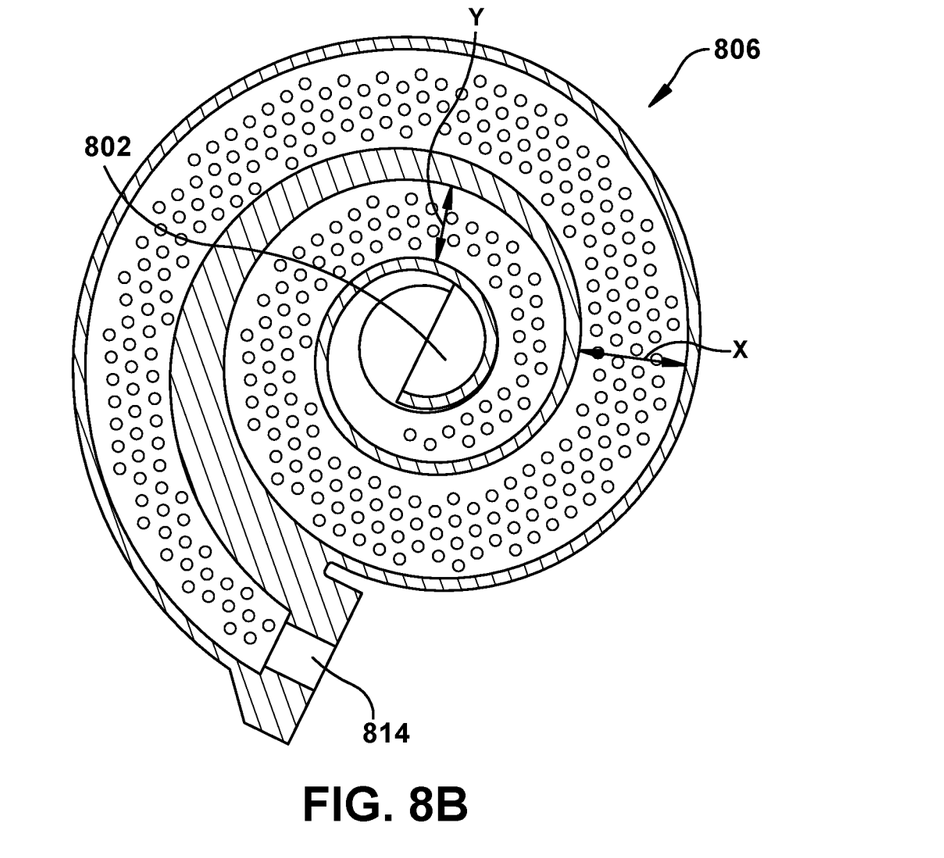
FIG. 8B is a cross-sectional view taken approximately along line 8B-8B in FIG. 8A, and showing a spiral-shaped separation device used in the effluent processing apparatus of FIG. 8A.

Referring to FIG. 8A, a schematic diagram shows an effluent processing apparatus 200*f* constructed in accordance with a seventh embodiment. The effluent processing apparatus 200*f* includes an inlet port 802 through which effluent containing a mixture of air, oil, and water from the purge valve 126 (FIG. 1) of the air dryer 108 can be received. Alternatively, the effluent may be received from any device that collects air, water, and contaminants. The effluent mixture flows from the input port 802 through a separator device in the form of a spiral-shaped channel 806 to separate oil and water from the effluent mixture. An example spiral-shaped channel 806 having the inlet port 802 and a combined air and water outlet 814 is shown in FIG. 8B. Oil-free air (i.e., clean air) from the spiral-shaped channel 806 is exhausted horizontally through the outlet 814 to atmosphere.

The effluent processing apparatus 200*f* also includes a member 810 in the form of a mesh screen that is disposed below the spiral-shaped channel 806. The mesh screen 810 comprises oleophilic material that selectively allows only oil in the separated oil and water from the spiral-shaped channel 806 to flow through mesh openings in the mesh screen 810. The mesh screen 810 is arranged to receive the separated oil and water from the spiral-shaped channel 806 to allow the oil to flow through mesh openings in the mesh screen 810 and to prevent the water from flowing through mesh openings in the mesh screen 810.

The effluent processing apparatus 200f further includes a sump 812 that is arranged to receive and retain oil that has flowed through mesh openings in the mesh screen 810. The sump 812 is disposed below the mesh screen 810 and has an oil outlet 816. Optionally, the sump 812 contains collection media 813 that may include a sponge material, for example. Other collection media can be used. Alternatively, no collection media may be used, and the space is designed to collect and keep oil from exiting the sump 812. If used, the collection media 813 holds the oil until the collection media 813 or the sump 812 or both, are replaced. Air and water that has been prevented from flowing through mesh openings in the mesh screen 810 are directed through the outlet 814 to atmosphere.

More specifically, in the seventh embodiment of the effluent processing apparatus 200f shown in FIG. 8A, the mesh screen 810 is disposed above the sump 812 and has a plane-shape such that water that has been prevented from flowing through mesh openings in the mesh screen 810 flows horizontally through the combined air and water outlet 814 and drains to atmosphere. Oil outlet 816 allows oil that has been retained in the sump 812 to be drained out.

Figure 9:
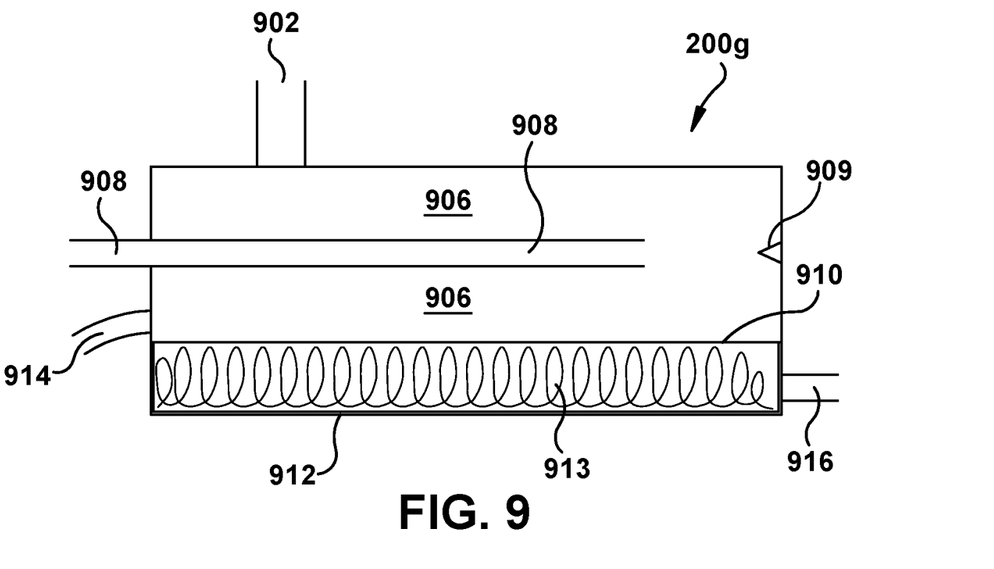
FIG. 9 is a schematic diagram showing the effluent processing apparatus of FIG. 1 constructed in accordance with an eighth embodiment.

Referring to FIG. 9, a schematic diagram shows an effluent processing apparatus 200g constructed in accordance with an eighth embodiment. The effluent processing apparatus 200g includes an inlet port 902 through which effluent containing a mixture of air, oil, and water from the purge valve 126 (FIG. 1) of the air dryer 108 can be received. Alternatively, the effluent may be received from any device that collects air, water, and contaminants. The effluent mixture flows from the input port 902 through an effluent channel 906 to separate oil and water from the effluent mixture. Oil-free air from the effluent channel 906 is exhausted horizontally through an air outlet tube 908 to atmosphere. A protruded piece 909 is disposed at one end of the air outlet tube 908 and is provided for facilitating the formation of a vortex (or a cyclone) such that the oil-free air from the effluent channel 906 flows into the air outlet tube 908.

The effluent processing apparatus 200g also includes a member 910 in the form of a mesh screen that is disposed below the air outlet tube 908. The mesh screen 910 comprises oleophilic material that selectively allows only oil in the separated oil and water from the effluent channel 906 to flow through mesh openings in the mesh screen 910. The mesh screen 910 is arranged to receive the separated oil and water from the effluent channel 906 to allow the oil to flow through mesh openings in the mesh screen 910 and to prevent the water from flowing through mesh openings in the mesh screen 910.

The effluent processing apparatus 200g further includes a sump 912 that is arranged to receive and retain oil that has flowed through mesh openings in the mesh screen 910. The sump 912 is disposed below the mesh screen 910 and has an oil outlet 916. Optionally, the sump 912 contains collection media 913 that may include a sponge material, for example. Other collection media can be used. Alternatively, no collection media may be used, and the space is designed to collect and keep oil from exiting the sump 912. If used, the collection media 913 holds the oil until the collection media 913 or the sump 912 or both, are replaced. Water that has been prevented from flowing through mesh openings in the mesh screen 910 is drained through a water outlet 914 to atmosphere.

More specifically, in the eighth embodiment of the effluent processing apparatus 200g shown in FIG. 9, the mesh screen 910 is disposed above the sump 912 and has a plane-shape such that water that has been prevented from flowing through mesh openings in the mesh screen 910 flows horizontally through the water outlet 914 and drains to atmosphere. The oil outlet 916 allows oil that has been retained in the sump 912 to be drained out.

Figure 10A:
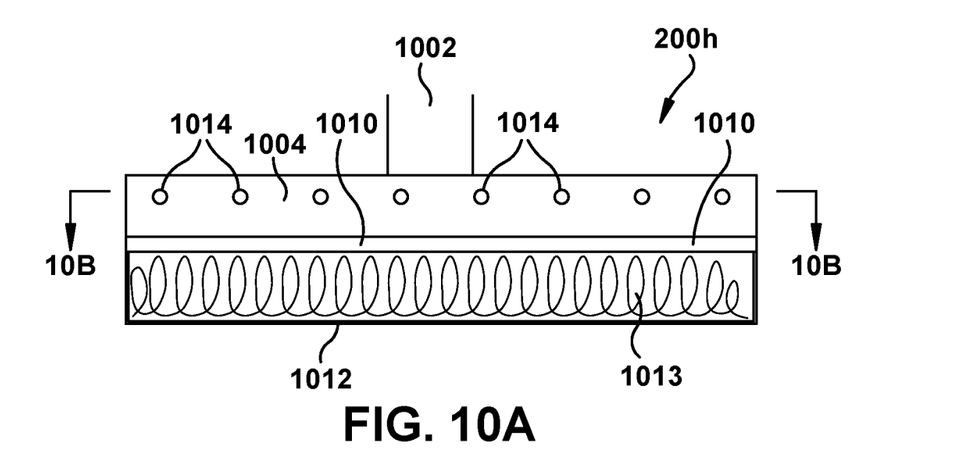
FIG. 10A is a schematic diagram showing the effluent processing apparatus of FIG. 1 constructed in accordance with a ninth embodiment.
Figure 10B:
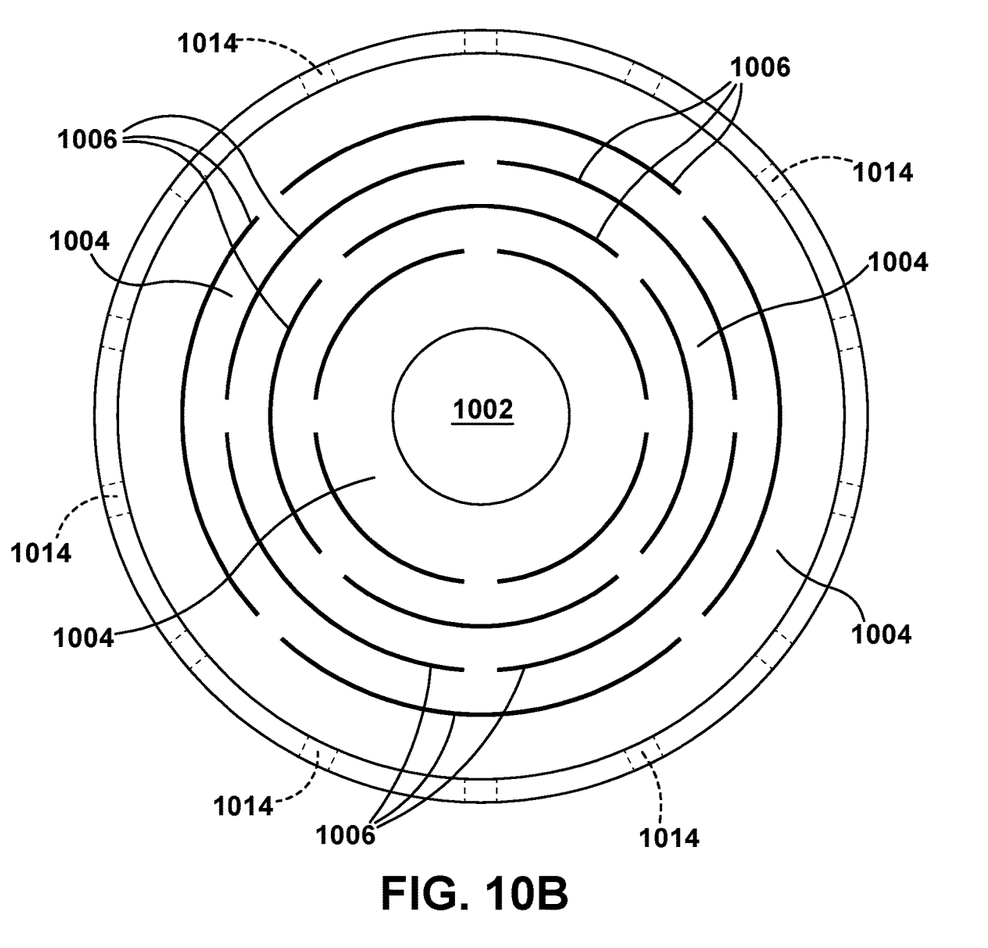
FIG. 10B is an example maze path of an effluent channel used in the effluent processing apparatus of FIG. 10A.

Referring to FIG. 10A, a schematic diagram shows an effluent processing apparatus 200h constructed in accordance with a ninth embodiment. The effluent processing apparatus 200 includes an inlet port 1002 through which effluent containing a mixture of air, oil, and water from the purge valve 126 (FIG. 1) of the air dryer 108 can be received. Alternatively, the effluent may be received from any device that collects air, water, and contaminants. The effluent mixture flows from the input port 1002 through a maze path of an effluent channel 1004 to separate oil and water from the effluent mixture. An example maze path of the effluent channel 1004 that can be used in the effluent processing apparatus 200h of FIG. 10A is shown in FIG. 10B. The maze path of the effluent channel 1004 is defined by a number of baffles 1006. Oil-free air (i.e., clean air) from the effluent channel 1006 is exhausted horizontally through a multiple number of combined air and water outlets 1014 (e.g., eight combined air and water outlets shown in FIG. 10A) to atmosphere.

The effluent processing apparatus 200h also includes a member 1010 in the form of a mesh screen that is disposed below the air outlets 1014. The mesh screen 1010 comprises oleophilic material that selectively allows only oil in the separated oil and water from the effluent channel 1004 to flow through mesh openings in the mesh screen 1010. The mesh screen 1010 is arranged to receive the separated oil and water from the effluent channel 1004 to allow the oil to flow through mesh openings in the mesh screen 1010 and to prevent the water from flowing through mesh openings in the mesh screen 1010.

The effluent processing apparatus 200h further includes a sump 1012 that is disposed below the mesh screen 1010 and has an oil outlet 1016. The sump 1012 is arranged to receive and retain oil that has flowed through mesh openings in the mesh screen 1010. Optionally, the sump 1012 contains collection media 1013 that may include a sponge material, for example. Other collection media can be used. Alternatively, no collection media may be used, and the space is designed to collect and keep oil from exiting the sump 1012. If used, the collection media 1013 holds the oil until the collection media 1013 or the sump 1012 or both, are replaced. Water that has been prevented from flowing through mesh openings in the mesh screen 1010 is drained through the combined air and water outlets 1014 to atmosphere.

More specifically, in the ninth embodiment of the effluent processing apparatus 200h shown in FIG. 10A, the mesh screen 1010 is disposed above the sump 1012 and has a plane-shape such that water that has been prevented from flowing through mesh openings in the mesh screen 1010 flows horizontally through the combined air and water outlets 1014 and drains to atmosphere.

Figure 11:
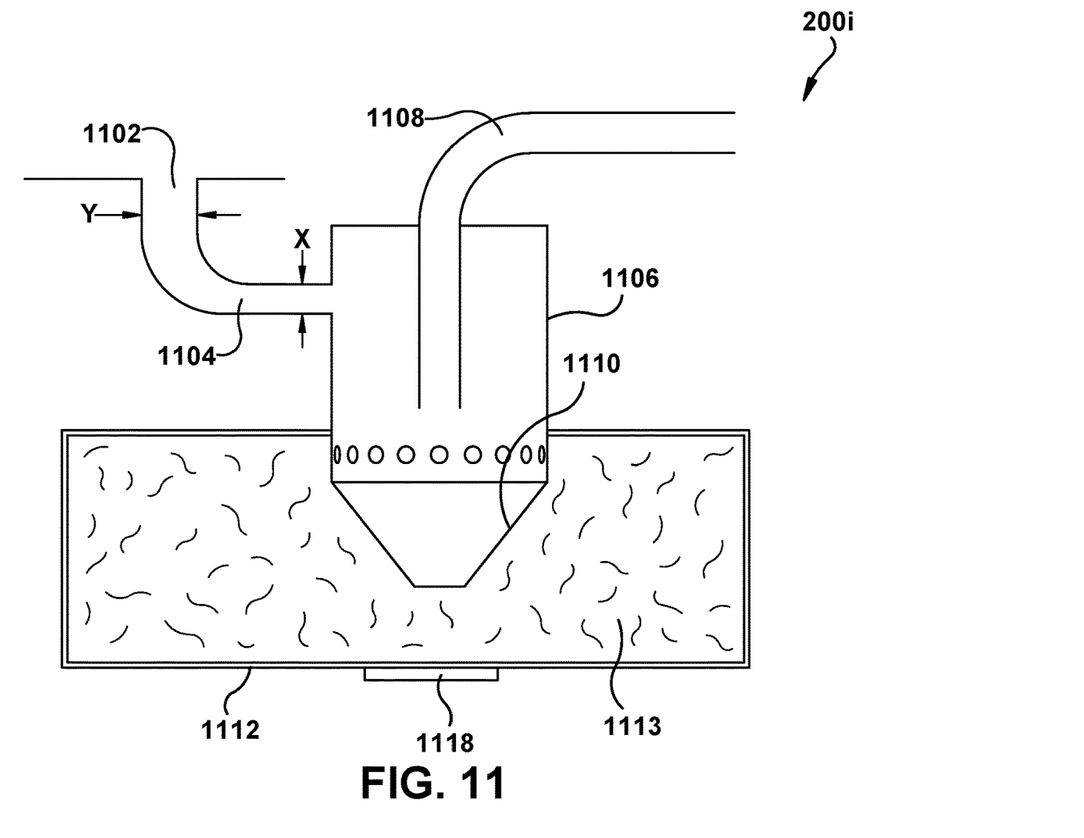
FIG. 11 is a schematic diagram showing the effluent processing apparatus of FIG. 1 constructed in accordance with a tenth embodiment.

Referring to FIG. 11, a schematic diagram shows an effluent processing apparatus 200i constructed in accordance with a tenth embodiment. The effluent processing apparatus 200i of FIG. 11 is a variant of the effluent processing apparatus 200 of FIG. 2 but with a larger replaceable collection sump. The effluent processing apparatus 200i includes an inlet port 1102 through which effluent containing a mixture of air, oil, and water from the purge valve 126 (FIG. 1) of the air dryer 108 can be received. Alternatively, the effluent may be received from any device that collects air, water, and contaminants. An effluent channel 1104 interconnects the inlet port 1102 and a separator device 1106. The cross-section "X" of the effluent channel 1104 at the separator device 1106 is smaller as compared to the cross-section "Y" at the inlet port 1102 to increase the velocity of the effluent as the effluent flows from the inlet port 1102 to the separator device 1106.

The separator device 1106 is arranged to separate oil and water from the effluent mixture. The separator device 1106 may have any configuration that can separate oil and water from the effluent mixture to provide clean air. As an example, the separator device 1106 may have a configuration of a cyclone through which the effluent mixture flows to separate oil and water from the effluent mixture. As another example, the separator device 1106 may have a configuration of a spiral-channel through which the effluent mixture flows to separate oil and water from the effluent mixture. Other configurations of the separator device 1106 are possible. Oil-free air (i.e., clean air) from the separator device 1106 is exhausted upwards through an air outlet 1108 to atmosphere.

The effluent processing apparatus 200i also includes a member 1110 in the form of a first mesh screen that is disposed below the air outlet 1108. The first mesh screen 1110 comprises oleophilic material that selectively allows only oil in the separated oil and water from the separator device 1106 to flow through mesh openings in the first mesh screen 1110. The first mesh screen 1110 is arranged to receive the separated oil and water from the separator device 1106 to allow the oil to flow through mesh openings in the mesh screen 1110 and to prevent the water from flowing through mesh openings in the first mesh screen 1110.

The effluent processing apparatus 200i further includes a sump 1112 that is disposed below the first mesh screen 1110. The sump 1112 is arranged to receive and retain oil that has flowed through mesh openings in the first mesh screen 1110. Optionally, the sump 1112 contains collection media 1113 that may include a sponge material, for example. Other collection media can be used. Alternatively, no collection media may be used, and the space is designed to collect and keep oil from exiting the sump 1112. If used, the collection media 1113 holds the oil until the collection media 1113 or the sump 1112 or both, are replaced. Water that has been prevented from flowing through mesh openings in the first mesh screen 1110 is drained through another member 1118 in the form of a second mesh screen to atmosphere.

More specifically, in the tenth embodiment of the effluent processing apparatus 200i shown in FIG. 11, the second mesh screen 1118 is disposed directly below the first mesh screen 1110 and the sump 1112. The second mesh screen 1118 comprises hydrophilic material that selectively allows only water in the sump 1112 to flow through mesh openings in the second mesh screen 1118. Although the second mesh screen 1118 is shown in FIG. 11 as being disposed directly below the first mesh screen 1110, it is conceivable that the second mesh screen 1118 be offset (i.e., to the left or to the right looking at FIG. 11) relative to the first mesh screen 1110.

Figure 12:
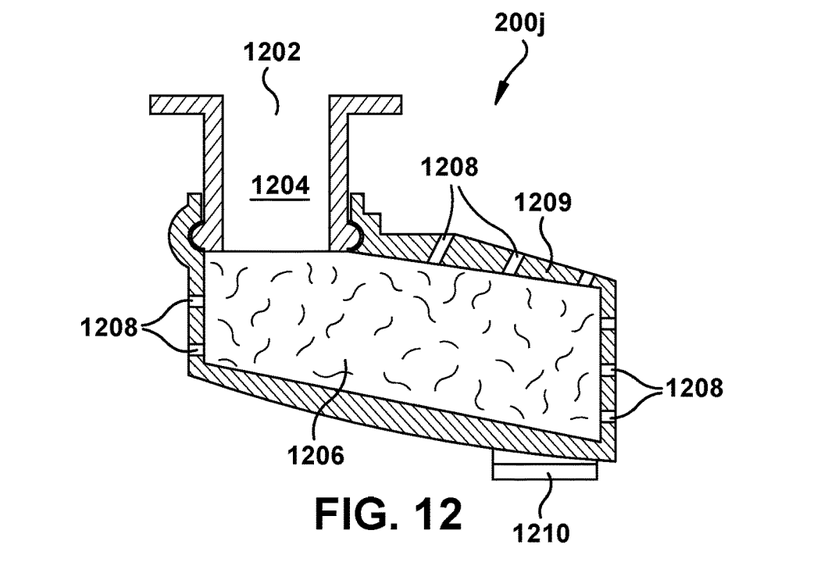
FIG. 12 is a schematic diagram showing the effluent processing apparatus of FIG. 1 constructed in accordance with an eleventh embodiment.

Referring to FIG. 12, a schematic diagram shows an effluent processing apparatus 200j constructed in accordance with an eleventh embodiment. The effluent processing apparatus 200j includes an inlet port 1202 through which effluent containing a mixture of air, oil, and water from the purge valve 126 (FIG. 1) of the air dryer 108 can be received. Alternatively, the effluent may be received from any device that collects air, water, and contaminants. An effluent channel 1204 interconnects the inlet port 1202 and a separator device 1206 in the form of a bed of oil absorbing desiccant. The oil absorbing desiccant 1206 is arranged to separate oil and water from the effluent mixture. Oil-free air (i.e., clean air) from the oil absorbing desiccant 1206 is exhausted through a multiple number of air outlets 1208 of a housing 1209 to atmosphere. The housing 1209 may comprise a clear plastic material that allows maintenance or service personnel to see the condition of the oil absorbing desiccant 1206.

The effluent processing apparatus 200j also includes a member 1210 in the form of a mesh screen that is disposed at bottom of the housing 1209. The mesh screen 1210 comprises hydrophilic material that selectively allows only water in the separated oil and water from the oil absorbing desiccant 1206 to flow through mesh openings in the mesh screen 1210. The mesh screen 1210 is arranged to receive the separated oil and water from the separator device 1106 to allow the water to flow through mesh openings in the mesh screen 1210 to drain to atmosphere, and to prevent the oil from flowing through mesh openings in the mesh screen 1210.

More specifically, in the eleventh embodiment of the effluent processing apparatus 200j shown in FIG. 12, the oil absorbing desiccant 1206 acts as both an effluent channel through which the effluent mixture flows and a sump for holding oil.

Although the above-description describes the eleventh embodiment of FIG. 12 as including a clear plastic housing, it conceivable that any of the other embodiments may be provided with a clear housing.

Also, although the above description describes each processing apparatus of the various embodiments as having one or more members in the form of one or more mesh screens, it is conceivable that the one or more members be in the form of another material with an interlaced structure. It is also conceivable that the one or more members be in the form of material with a non-interlaced structure. As an example, the non-interlaced structure may comprise a single-piece grill. Other materials with a non-interlaced (or an interlaced) structure are possible.

Also, although the above description describes each effluent processing apparatus of the various embodiments as being a standalone apparatus, it is conceivable that the effluent processing apparatus be part of an adapter unit that is connectable to the purge valve 126 of the air dryer 108 (FIG. 1). Moreover, although only some of the embodiments described herein include a single passage for water and air to flow to atmosphere, it is conceivable that any of the other embodiments be redesigned so that water and air can flow through the same passage to atmosphere.

Further, although the above-description describes the effluent processing apparatus being used in a heavy vehicle such as a truck, it is conceivable that the effluent processing apparatus may be used in other types of heavy vehicles, such as busses for example.

It should be apparent that the effluent processing apparatus in each of the above-described embodiments comprises a mesh for allowing either only oil or only water of the separated oil and water from a separator device to pass from a first side of the mesh through openings in the mesh to a second side of the mesh. The sump is arranged to (i) receive and retain the oil on the first side of the mesh if only water passes from the first side to the second side, and (ii) receive and retain the oil on the second side of the mesh if only oil passes from the first side to the second side. In some embodiments, the separator device includes one or more baffles positioned relative to the mesh to deflect the effluent mixture to create impact force to assist in separating oil, water, and air.

The mesh screen comprises hydrophilic material if only water is allowed to pass from the first side of the mesh to the second side of the mesh. In some embodiments, the mesh openings in the hydrophilic mesh screen have an average opening size between about $8.0 \times 10^{-4}$ inches (0.002 centimeters) and about $8.0 \times 10^{-3}$ inches (0.02 centimeters). The mesh comprises oleophilic material if only oil is allowed to pass from the first side of the mesh through openings in the mesh to the second side of the mesh. In some embodiments, the mesh openings in the oleophilic mesh screen have an average opening size between about $8.0 \times 10^{-4}$ inches (0.002 centimeters) and $8.0 \times 10^{-3}$ inches (0.02 centimeters).

In some embodiments, a super-oleophobic mesh may be used. The super-oleophobic mesh has an oil contact angle between about 150 degrees and about 180 degrees. In some embodiments, a super-hydrophobic mesh may be used. The super-hydrophobic mesh has water contact angle between about 150 degrees and about 180 degrees.

It should also be apparent that the effluent processing apparatus has a shape with a relatively low profile and relatively small overall physical dimensions. This allows the effluent processing apparatus to be more easily installed in applications where available installation space is relatively tight. It is conceivable that the effluent processing apparatus may have other profile shapes and other overall physical dimensions depending upon the needs of the particular application.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An effluent processing apparatus comprising:
   an input port arranged to receive an effluent mixture containing air, oil, and water;
   baffles positioned between the input port and at least one air outlet to deflect the effluent mixture to assist in separating the oil and the water from the air, wherein the baffles radiate circumferentially outward in a maze path from the input port to the at least one air outlet;
   a member for selectively allowing only oil of the separated oil and water to pass from a first side of the member through openings in the member to a second side of the member;
   a sump arranged to receive and retain the oil on the second side of the member as the oil passes from the first side to the second side; and
   the at least one air outlet through which air is exhausted to atmosphere.

2. The effluent processing apparatus as in claim 1, wherein the member comprises a mesh of oleophilic material to allow only oil of the separated oil and water from the separator device to pass through the openings in the mesh.

3. The effluent processing apparatus as in claim 1, wherein the member is arranged in a plane perpendicular to the input port.

4. The effluent processing apparatus as in claim 1, wherein the member is disposed below the baffles and the at least one air outlet.

5. The effluent processing apparatus as in claim 1, wherein the at least one air outlet is also a water outlet.

6. The effluent processing apparatus as in claim 5, wherein the at least one air outlet and water outlet comprises eight combined air outlets and water outlets.

7. The effluent processing apparatus as in claim 1, wherein the input port is arranged vertically with respect to the baffles and the at least one air outlet is arranged horizontally with respect to the baffles.

8. The effluent processing apparatus as in claim 1, wherein the sump contains a collection media for retaining oil that has passed through the member.

9. A method of separating air, oil and water from an effluent mixture comprising:
   providing an effluent mixture containing air, oil and water at an input port of an effluent processing apparatus;
   providing a flow path for the effluent mixture, the flow path having baffles, wherein the baffles radiate circumferentially outward in a maze path from the input port to the at least one air outlet;
   passing the effluent mixture through the flow path such that the effluent mixture is impacted against the baffles to separate oil and water from the air as the effluent mixture passes through the flow path;
   passing only oil vertically through a member located below the baffles; and
   exhausting the air and the water horizontally through at least one outlet port.

10. The method as in claim 9, wherein the member is a mesh of oleophilic material.

11. The method as in claim 9, further comprising collecting the oil in a sump as it passes through the member.

12. The method as in claim 9, further comprising exhausting the air and water through the at least one outlet port to atmosphere.

* * * * *